(12) United States Patent
Sorachi et al.

(10) Patent No.: US 7,728,474 B2
(45) Date of Patent: Jun. 1, 2010

(54) ROTOR OF MAGNETO GENERATOR

(75) Inventors: Shigehiko Sorachi, Tokyo (JP); Hirohisa Yokota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 359 days.

(21) Appl. No.: 11/949,870

(22) Filed: Dec. 4, 2007

(65) Prior Publication Data
US 2008/0278016 A1    Nov. 13, 2008

(30) Foreign Application Priority Data
May 7, 2007    (JP)    ............................. 2007-122475

(51) Int. Cl.
*H02K 7/02* (2006.01)
(52) U.S. Cl. ..................... 310/74; 310/153; 310/156.26
(58) Field of Classification Search .................. 310/74, 310/153, 75 R, 156.12, 156.26, 156.28, 156.55
See application file for complete search history.

(56) References Cited

U.S. PATENT DOCUMENTS

| | | | | |
|---|---|---|---|---|
| 3,974,817 A | * | 8/1976 | Henderson et al. ...... | 123/149 D |
| 4,873,962 A | * | 10/1989 | Safranek ...................... | 123/599 |
| 4,877,986 A | * | 10/1989 | Shimizu ...................... | 310/153 |
| 5,530,305 A | * | 6/1996 | Krueger et al. ................ | 310/74 |
| 5,998,902 A | * | 12/1999 | Sleder et al. ................ | 310/153 |
| 6,137,199 A | * | 10/2000 | Lindsley ...................... | 310/74 |
| 6,450,846 B2 | * | 9/2002 | Morikami .................... | 440/53 |
| 6,614,140 B2 | * | 9/2003 | Uemura et al. ......... | 310/156.12 |
| 6,794,776 B1 | * | 9/2004 | Gabrys ........................ | 310/74 |
| 7,166,942 B2 | * | 1/2007 | Yokota ........................ | 310/54 |
| 7,414,341 B2 | * | 8/2008 | Yokota .................. | 310/156.28 |

FOREIGN PATENT DOCUMENTS

| | | |
|---|---|---|
| JP | 61-205271 U | 12/1986 |
| JP | 07-046781 A | 2/1995 |
| JP | 2002-247785 A | 8/2002 |
| JP | 2003-274601 A | 9/2003 |

* cited by examiner

*Primary Examiner*—Thanh Lam
(74) *Attorney, Agent, or Firm*—Sughrue Mion, PLLC

(57) ABSTRACT

In a rotor of a magneto generator in which permanent magnets are attached to the inner circumference of a peripheral wall of a cup-shaped formed flywheel, and a plurality of trigger poles are arranged on the outer circumference of the flywheel; the plurality of trigger poles are simultaneously punched out by press working to form a protrusion ring which is formed of a separate member from the flywheel, and the protrusion ring is integrally incorporated to the flywheel to configure the rotor.

5 Claims, 4 Drawing Sheets

ROTOR OF MAGNETO GENERATOR

BACKGROUND OF THE INVENTION

1. Field of the Invention

The present invention relates to a rotor of a magneto generator for generating electricity under the action of electromagnetic induction produced between magnets and an armature winding by rotation of a flywheel.

2. Description of the Related Art

In an internal combustion engine, engine crank angle information and engine rotational speed information are required when controlling an ignition timing, a fuel injection time, and the like. Therefore, for example, as disclosed in Japanese Unexamined Patent Publication No. 2003-274601, when a flywheel magnet rotor is used as a rotor of a magneto generator, there is known a configuration in which an inductor magnetic pole portion made of protrusions is provided on the outer circumference of a peripheral wall of the flywheel so that the inductor magnetic pole portion is used to generate pulses including crank angle information and rotational speed information by a pulser (signal generator). In addition, the same publication discloses that the inductor magnetic pole portion is formed by punching out a part of the peripheral wall of the flywheel from the inner side to the outer side; and in order to correct an imbalance in mass due to protrusions of the inductor magnetic pole portion on the outside, a concave portion is formed on the inside of the inductor magnetic pole portion and a correction weight for the imbalance in mass is provided.

FIGS. 3A to 3C and FIGS. 4A to 4C are views showing other known examples, in each of which a protrusion portion (inductor magnetic pole portion) is formed on a peripheral wall of such a flywheel, for showing a known magneto generator to be objected in the present invention. First, FIG. 3A shows a front view; FIG. 3B shows a partial cross-sectional side view; and FIG. 3C shows a partially enlarged view of FIG. 3B. Referring to FIGS. 3A to 3C, reference numeral 1 denotes a bowl-shaped (cup-shaped) formed flywheel; 2 denotes a plurality of magnets circumferentially arranged on the inner circumference of a peripheral wall of the flywheel 1; 3 denotes a magnet cover serving as a cylindrical guard ring closely fitted to the inner circumferential side of the circularly arranged magnets 2; and 4 denotes resin or molding material filled in gaps between the magnets 2, for integrally securing the magnets 2 and the magnet cover 3 to the flywheel 1.

A plurality of protrusions (also referred to as trigger pole hereinafter) 5 arranged at equally spaced intervals are formed on an outer circumferential surface of the flywheel 1; and, there is formed a toothless portion NT that is a place where a trigger pole 5 is partly lacked. The place where the trigger pole is lacked, that is, the toothless portion NT is a reference position; and, since the flywheel 1 is directly connected to a crankshaft of an engine, the rotation state of the flywheel 1 is the same as that of the engine. Therefore, the rotation state of the flywheel 1, that is, the rotation state of the engine can be confirmed by detecting the toothless portion NT with a signal sensor S.

In addition, presence of the toothless portion NT means that the flywheel is not kept in balance; and, in order to correct the imbalance, a balance correction hole is provided at a symmetrical position of the toothless portion NT on the outer circumferential surface of the flywheel 1.

Furthermore, there exists a boss 6 which is attached to a rotation shaft at the center in a sidewall of the flywheel 1; a key groove 7 is formed on the boss 6; and the key groove 7 and the toothless portion NT serving as the reference position of the trigger poles 5 are arranged to form a predetermined angle.

A stator 8 having an armature winding which is for generating electricity under the action of electromagnetic induction produced with the magnets 2 by the rotation of the flywheel 1 is formed on the inner circumferential side of the flywheel 1. The stator 8 includes a magneto coil (armature winding) 8c wound to a laminated core made of a plurality of thin steel sheets. Insulating material (for example, resin mold and epoxy system powder coating) which is for ensuring insulation with respect to the magneto coil 8c is applied to the laminated core; and an armoring process (varnish, epoxy resin, and the like) which is for ensuring rigidity and insulation quality is applied to the magneto coil 8c.

In addition, FIG. 4A to 4C are views showing a known example in which a plurality of trigger poles 5 are punched out in an axial direction of the magneto generator.

In such known flywheel magneto generators, the trigger poles 5 are protrusions, each of the trigger poles being formed by punching out from an inner circumferential surface to an outer circumferential surface of the flywheel 1; and therefore, a good deal of process and time are required for manufacturing the trigger poles. In addition, there exists a place (toothless portion NT) where one protrusion is lacked with respect to the protrusions 5 arranged at equally spaced intervals, and the balance correction hole is formed at the symmetrical place with respect to the toothless portion NT; however, as for a forming process of the balance correction hole, a process different from a protrusion punching-out process is required.

Furthermore, in the method which punches out the protrusions 5 from the inner circumferential surface to the outer circumferential surface of such flywheel 1, roundness of the inner circumferential surface of the flywheel 1 is degraded and it is difficult to ensure inner diameter accuracy of the flywheel 1.

Besides, formation of the trigger poles 5 of the flywheel 1 can be performed by a cutting-out method different from the punching-out method; however, in the cutting-out method, cutting-out is necessary for each protrusion; and accordingly, longer time in manufacturing time is required.

Further, in the structure in which the trigger poles 5 are punched out in the axial direction, there arise drawbacks in that it is large in the number of components; an air gap g between the signal sensor S and the trigger pole 5 is unstable by summation tolerances of the respective components; and a variation in signal is concerned.

BRIEF SUMMARY OF THE INVENTION

An object of the present invention is to solve the foregoing problems of the known devices and to provide a rotor of a magneto generator in which a process and time for manufacturing trigger poles can be considerably shortened, inner diameter accuracy of a flywheel can be ensured, and a stable air gap between a fixed portion and a rotational portion can be ensured.

According to the present invention, there is provided a rotor of a magneto generator in which permanent magnets are attached to the inner circumference of a peripheral wall of a cup-shaped formed flywheel, and a plurality of trigger poles are arranged on the outer circumference of the flywheel. The plurality of trigger poles are simultaneously punched out by press working to form a protrusion ring which is formed of a separate member from the flywheel, and the protrusion ring is integrally incorporated to the flywheel to configure the rotor.

Furthermore, the protrusion ring is formed with the trigger poles at equally spaced intervals in a circumferential direction of the flywheel, and provided with a toothless portion representing a reference position of the trigger poles and a balance correction hole which is for correcting imbalance due to the toothless portion. The toothless portion and the balance correction hole are simultaneously formed when the trigger poles are formed by press working.

According to the rotor of the magneto generator of the present invention, there can be obtained a rotor of a magneto generator in which a process and time for manufacturing trigger poles (protrusions) can be considerably shortened, and inner diameter accuracy of a flywheel can be ensured; and therefore, a stable air gap between a fixed portion and a rotational portion can be ensured.

In addition, the balance correction hole is simultaneously punched out when the trigger poles are punched out by press working; and accordingly, a manufacturing process of the balance correction hole, which has been required before, can be eliminated.

The foregoing and other object, features, and advantages of the present invention will become more apparent from the following detailed description of the preferred embodiments and description shown in drawings.

BRIEF DESCRIPTION OF THE SEVERAL VIEWS OF THE DRAWING

FIG. 1A is a front view, FIG. 1B is a partial cross-sectional side view, FIG. 1C is a partially enlarged view of FIG. 1B;

FIG. 3A is a front view, FIG. 3B is a partial cross-sectional side view, and FIG. 3C is a partially enlarged view of FIG. 3B; FIG. 4A is a front view, FIG. 4B is a partial cross-sectional side view, and FIG. 4C is a partially enlarged view of FIG. 4B.

DETAILED DESCRIPTION OF THE INVENTION

Preferred Embodiment 1

A preferred embodiment 1 according to the present invention will be described with reference to FIGS. 1A to 1C and FIG. 2.

Figure 1C:
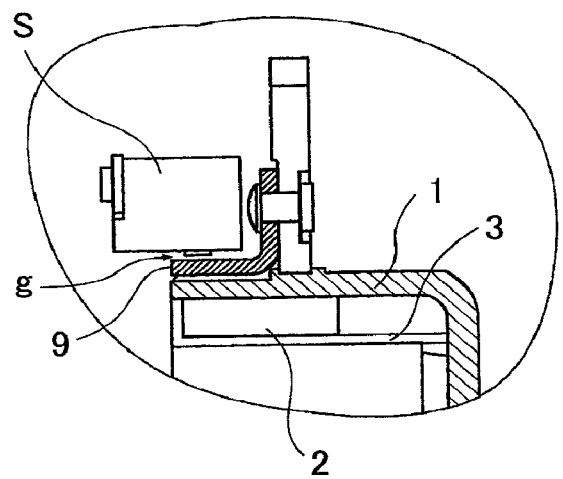
FIGS. 1A to 1C are views showing a rotor of a magneto generator in a preferred embodiment 1 according to the present invention.
Figure 1A:
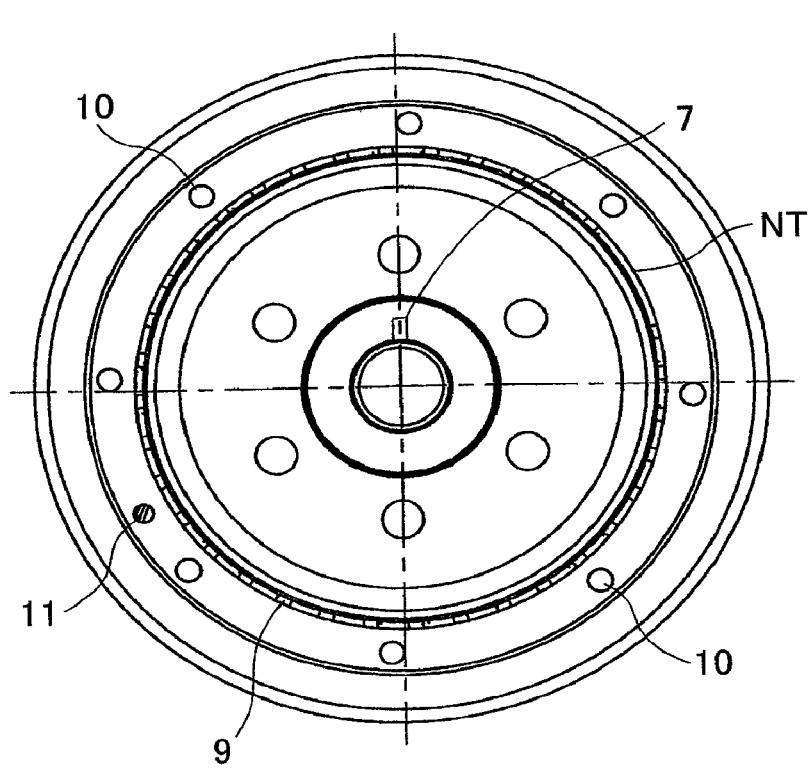
Figure 1B:
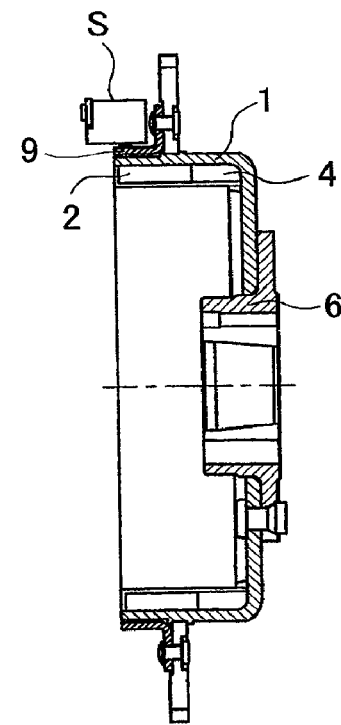
Figure 2:
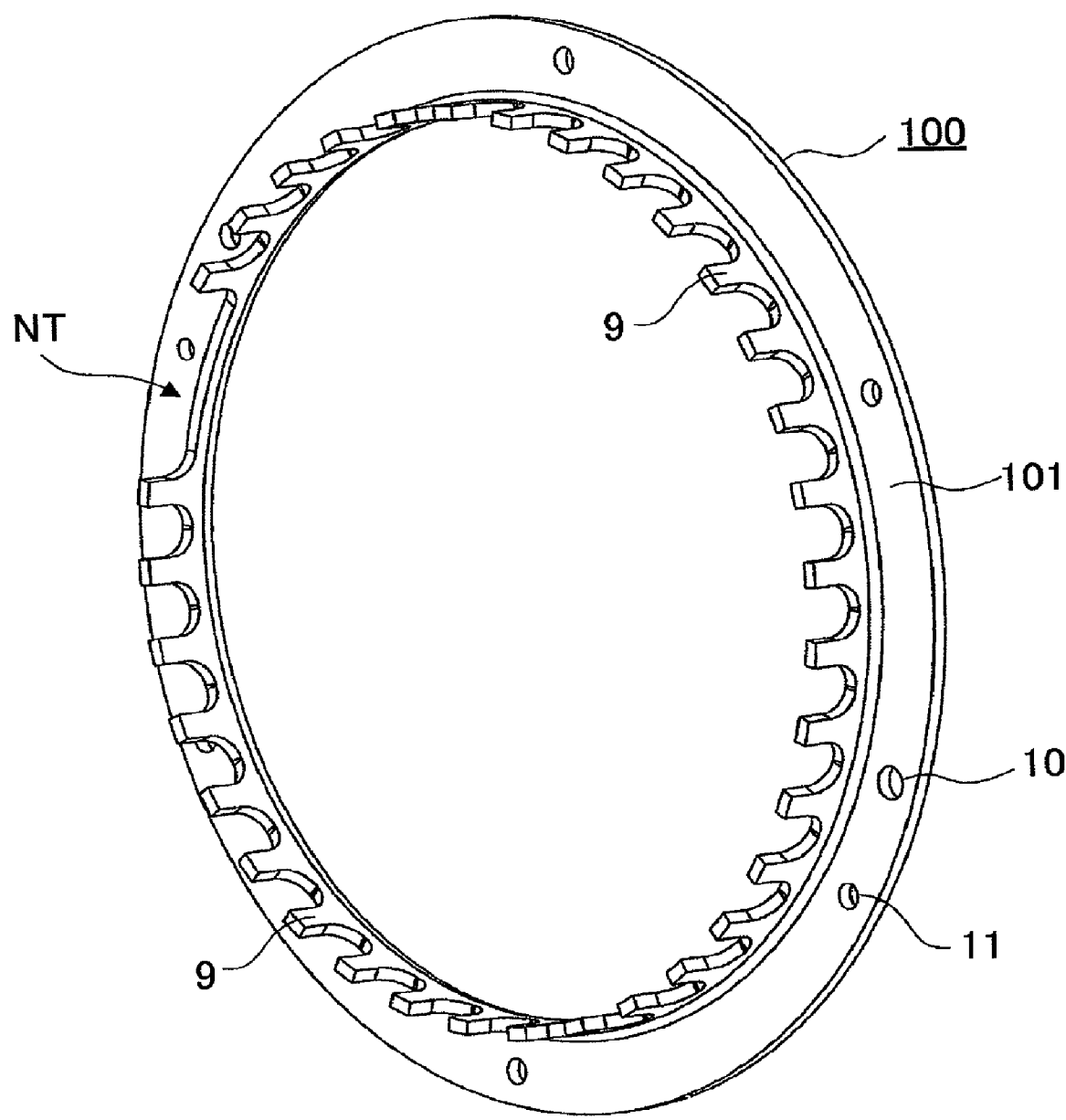
FIG. 2 is a perspective view showing an example of a protrusion ring serving as a major portion of the preferred embodiment 1 according to the present invention.
Figure 3C:
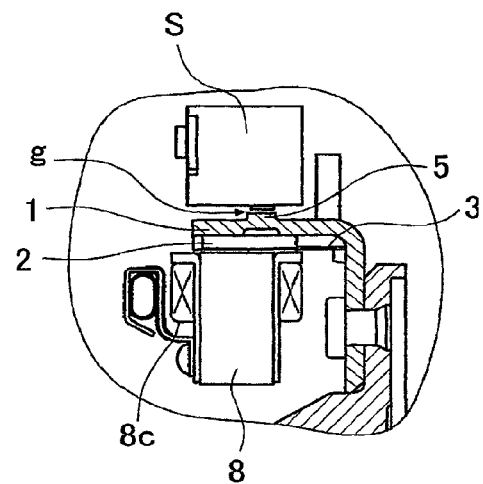
FIGS. 3A to 3C are views showing a rotor of a known magneto generator.
Figure 3A:
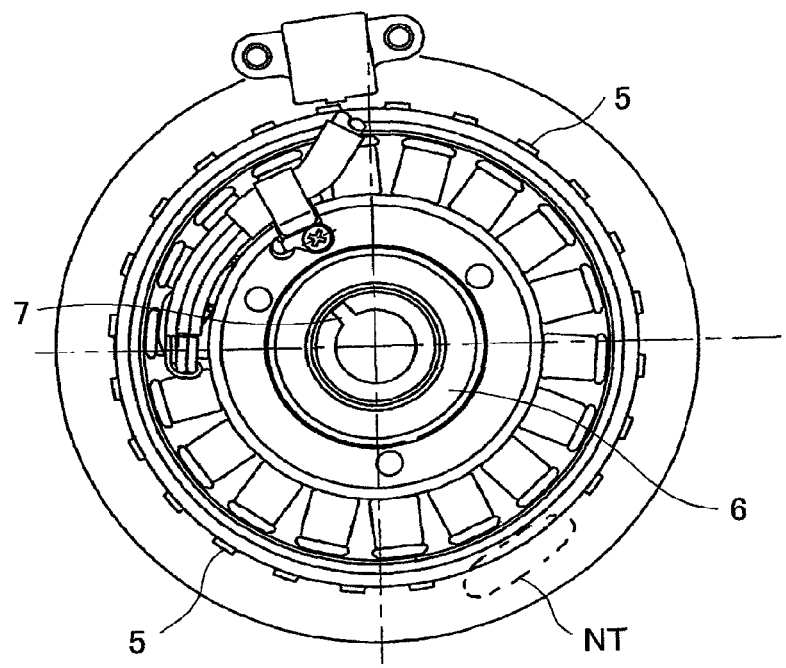
Figure 3B:
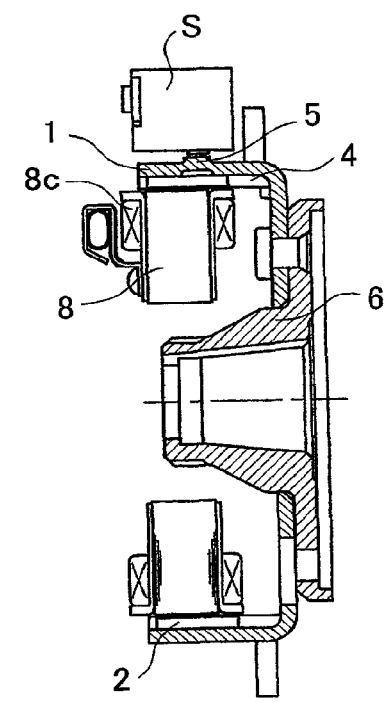
Figure 4C:
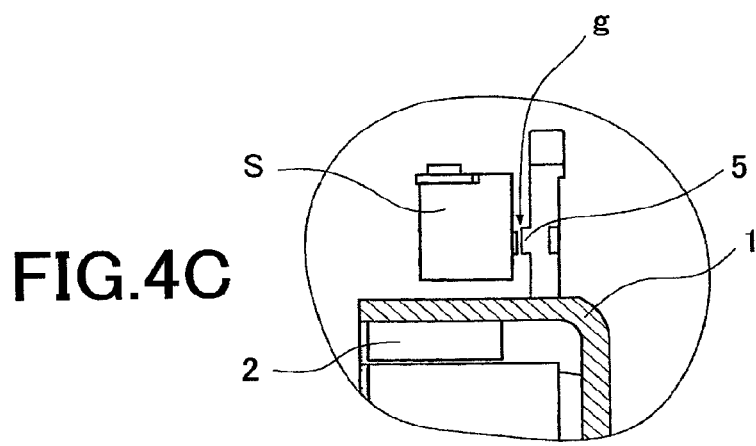
FIGS. 4A to 4C are views showing a rotor of other known magneto generator.
Figure 4A:
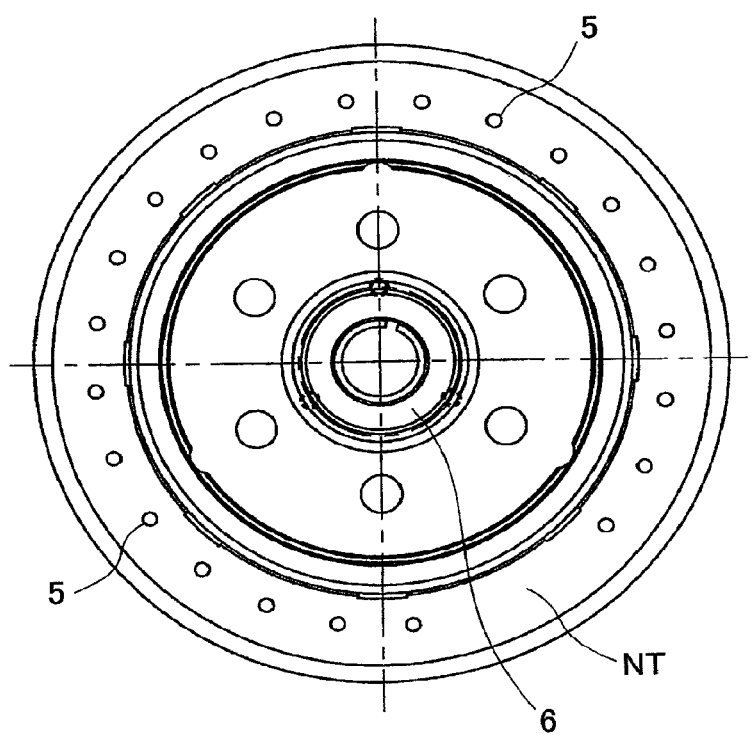
Figure 4B:
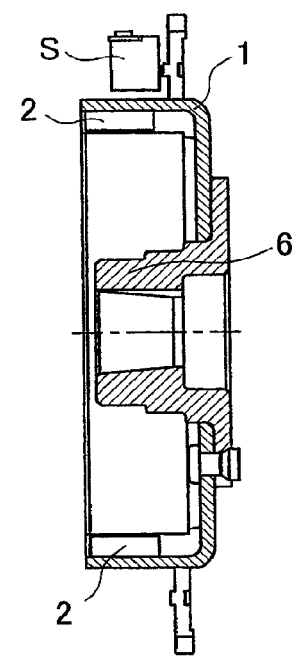

FIGS. 1A to 1C are views showing a configuration of a rotor of a magneto generator in the preferred embodiment 1 according to the present invention, FIG. 1A is a front view, FIG. 1B is a partial cross-sectional side view, FIG. 1C is a partially enlarged view of FIG. 1B; and FIG. 2 is a perspective view showing an example of a protrusion ring serving as a major portion of the present invention. Referring to the drawings, the same reference numerals as those shown in FIGS. 3A to 3C and FIGS. 4A to 4C represent the same or corresponding elements.

In FIGS. 1A to 1C, reference numerals 1 to 4, 6, and 7 are the same as those described in the above known devices, reference numeral 1 denotes a bowl-shaped (cup-shaped) formed flywheel; 2 denotes a plurality of magnets circumferentially arranged on the inner circumference of a peripheral wall of the flywheel 1; 3 denotes a magnet cover serving as a cylindrical guard ring closely fitted to the inner circumferential side of the circularly arranged magnets 2; 4 denotes resin or molding material filled in gaps between the magnets 2, for integrally securing the magnets 2 and the magnet cover 3 to the flywheel 1; 6 denotes a boss attached to a rotation shaft; and 7 denotes a key groove. In addition, in FIGS. 1A to 1C, a laminated core and a stator having an armature winding wound to the laminated core are omitted.

In FIG. 2, reference numeral 100 denotes a protrusion ring serving as a major portion of the present invention, which is configured as a separate component from the flywheel 1; a plurality of protrusions (also referred to as trigger pole hereinafter) 9 are simultaneously punched out by press working at circumferentially equally spaced intervals and bent in an L-shape to form the protrusion portion side and amounting portion 101 for attaching to the flywheel. Then, a plurality of rivet holes 10 which are for incorporating the protrusion ring to the flywheel 1 with rivets are formed in the mounting portion 101. In addition, there is provided a place where the trigger pole 9 is lacked, that is, a toothless portion NT is formed on the protrusion portion side; and a balance correction hole 11 is formed at a symmetrical place with respect to the toothless portion NT. In addition, the balance correction hole 11 doubles as a positioning hole so that the key groove 7 formed on the boss 6 mounted on the flywheel 1 and the trigger poles 9 can be arranged at a regular position. Furthermore, the balance correction hole 11 is simultaneously punched out when the trigger poles are punched out at a pressing process; and accordingly, a working process of the balance correction hole, which has been required before, can be eliminated.

The rotor of the magneto generator is manufactured by incorporating the thus configured protrusion ring 100 on the outer circumference of the flywheel 1 with rivets.

In addition, it will be understood that incorporation of the protrusion ring 100 to the flywheel 1 is not limited to the rivet structure; but, for example, the incorporation can be made by press fitting.

A signal sensor (also referred to as pickup hereinafter) S which is for reading a protrusion signal is arranged in the vicinity of the outer circumference of the trigger pole (protrusion portion) 9, and there is an air gap g between the trigger pole 9 and the pickup S. The trigger poles 9 rotate together with the flywheel 1; but, the pickup S is fixed and reads the signal of the trigger poles 9 without rotating.

In addition, in the description of the above preferred embodiment 1, the protrusion ring in which the trigger poles are punched out is manufactured by punching out to be in a ring shape from the beginning; however, the protrusion ring is not limited to this. For example, the protrusion ring may be formed in a ring shape after punching out the trigger poles using a belt-like member.

As described above, according to the rotor of the magneto generator in the preferred embodiment 1 of the present invention, the trigger pole and the balance correction hole, both of which have been integrally formed to the flywheel before, are combined with the flywheel after manufacturing as separate components from the flywheel; and therefore, a manufacturing process and time can be considerably shortened and a significant reduction in cost can be achieved.

In addition, inner diameter accuracy of the flywheel can be ensured and a stable air gap between a fixed portion and a rotational portion can be ensured; and therefore, reliability as a magneto generator can be enhanced.

Various modifications and alternations of this invention will be apparent to those skilled in the art without departing from the scope and spirit of this invention, and it should be understood that this is not limited to the illustrative embodiments set forth herein.

What is claimed is:

1. A rotor of a magneto generator, comprising:
a cup-shaped formed flywheel having a peripheral wall;
a plurality of permanent magnets attached to the inner circumference of the peripheral wall; and
a plurality of trigger poles arranged on the outer circumference of the flywheel, the rotor comprising:
a protrusion ring formed of a separate member from the flywheel, for being formed by simultaneously punching out the plurality of trigger poles by press working, and
the protrusion ring being integrally incorporated to the flywheel to configure the rotor.

2. The rotor of the magneto generator according to claim 1, wherein the protrusion ring is formed with the trigger poles at equally spaced intervals in a circumferential direction of the flywheel, and provided with a toothless portion representing a reference position of the trigger poles and a balance correction hole which is for correcting imbalance due to the toothless portion, the toothless portion and the balance correction hole being simultaneously formed when the trigger poles are formed by press working.

3. The rotor of the magneto generator according to claim 2, further comprising a boss formed with a key shape, the boss being mounted on the flywheel, and
wherein the protrusion ring is formed with a positioning hole which is for determining an angular position between the key shape and the protrusion ring.

4. The rotor of the magneto generator according to claim 3, wherein the positioning hole formed in the protrusion ring is served as the balance correction hole.

5. The rotor of the magneto generator according to claim 1, wherein the trigger poles have faces, each face being disposed in opposition to a signal sensor, and arranged in a radial direction of the flywheel to be of a signal detection structure in the radial direction.

* * * * *